United States Patent
Shlomai et al.

(10) Patent No.: US 8,078,577 B2
(45) Date of Patent: Dec. 13, 2011

(54) METHOD OF BI-DIRECTIONAL SYNCHRONIZATION OF USER DATA

(75) Inventors: Netzer Shlomai, Ra'anana (IL); Amos Lahav, Zoran (IL)

(73) Assignee: InstallFree, Inc., Stamford, CT (US)

( * ) Notice: Subject to any disclaimer, the term of this patent is extended or adjusted under 35 U.S.C. 154(b) by 312 days.

(21) Appl. No.: 12/419,037

(22) Filed: Apr. 6, 2009

(65) Prior Publication Data

US 2009/0254590 A1    Oct. 8, 2009

Related U.S. Application Data

(60) Provisional application No. 61/123,370, filed on Apr. 7, 2008.

(51) Int. Cl.
*G06F 7/00* (2006.01)
*G06F 17/00* (2006.01)

(52) U.S. Cl. ........ 707/610; 707/611; 707/612; 707/614; 707/620; 707/638; 709/203; 709/217; 709/219; 709/248

(58) Field of Classification Search ............. 707/610, 707/611, 612, 614, 620, 638; 709/203, 217, 709/219, 248
See application file for complete search history.

(56) References Cited

U.S. PATENT DOCUMENTS

| | | | |
|---|---|---|---|
| 2003/0028519 A1* | 2/2003 | Burgess | 707/1 |
| 2005/0075115 A1* | 4/2005 | Corneille et al. | 455/456.3 |
| 2005/0144284 A1* | 6/2005 | Ludwig et al. | 709/226 |
| 2006/0080656 A1* | 4/2006 | Cain et al. | 717/174 |
| 2007/0022155 A1* | 1/2007 | Owens et al. | 709/202 |
| 2007/0061347 A1* | 3/2007 | Burnley et al. | 707/100 |
| 2007/0088764 A1* | 4/2007 | Yoon et al. | 707/201 |
| 2007/0150482 A1* | 6/2007 | Taylor et al. | 707/10 |
| 2008/0288714 A1* | 11/2008 | Salomon et al. | 711/103 |

OTHER PUBLICATIONS

Liu et al.—"Efficient Implementation of OpenMP for Clusters with Implicit Data Distribution"—Shared Memory Parallel Programming with Open MP, SpringerLink—Computer Science, 2005, vol. 3349/2005, (pp. 121-136).*

Christoph Lindemann and Oliver P. Waldhorst—"Consistency Mechanisms for a Distributed Lookup Service supporting Mobil Applications"—Proceedings of the $3^{rd}$ ACM International workshop on Data Engineering for wireless and mobile access—ACM, New York, 2003 (pp. 61-68).*

* cited by examiner

*Primary Examiner* — Jean B Fleurantin
*Assistant Examiner* — Anh Ly
(74) *Attorney, Agent, or Firm* — Myers Wolin, LLC

(57) ABSTRACT

A method for bi-directional synchronization of user data files between a client and at least one server. The method comprises determining if a match exists between a local session file and a reflection session file, wherein the local session file is maintained by the client and the reflection session is maintained by the at least one server; when the local session file and the reflection session file match, performing: synchronizing contents of a user data file maintained by the client with contents of a user data file maintained by the at least one server, when the user data file in the client includes more records than the user data file in the at least one server; and synchronizing contents of a user data file maintained by the at least one server with contents of a user data file maintained by the client, when the user data file in the client includes less records than the user data file in the at least one server. In accordance with an embodiment of the invention the user data file includes a session file, an index file and a data file.

9 Claims, 5 Drawing Sheets

METHOD OF BI-DIRECTIONAL SYNCHRONIZATION OF USER DATA

CROSS-REFERENCE TO RELATED APPLICATIONS

This application claims the benefit of U.S. provisional application No. 61/123,370 filed on Apr. 7, 2008, the contents of which are herein incorporated by reference.

FIELD OF THE INVENTION

The present invention relates generally to execution of software applications, and more particularly to a method for synchronizing data between file servers and clients.

BACKGROUND OF THE INVENTION

Personal computers (PCs) serve a multitude of software applications, features and functions. The applications provide the user with tools to accomplish tasks, such as, but not limited to, document processing, spreadsheet management, email exchanges and Internet browsing. The features and functions are commonly referred to as "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality to the operating system, as well as ensuring that the application can be safely removed. Still, as an installation process is mostly carried-out by automatic installation programs, installation and setup of software applications remain a tedious task requiring as much as hours of work.

Generally, an automatic installation program performs the following activities: a) copying application software files from a removable storage (e.g., a compact disk) to the destination computer; b) configuring the operating system's parameters by, for example, the configuration of the system registry files; c) creating the application icons; and d) deleting temporary installation files.

Typically modern operating systems, such as Microsoft® XP® or Microsoft Vista® include a registry file for storing operating system user and application settings and options, dynamic link libraries (DLLs) which contains shared code, and named objects for naming functions shared by different processes. This structure of an operating system causes most of the challenges associated with application installation, most notable of which are:

1. Operating system Stability and Performance: Installations permanently modify the operating system (even after uninstalling) resulting in an incremental decline in operating system performance due to uninstalled leftovers (orphan files), inflated registry files, and so on.

2. Conflicts: Installations cause application conflicts due to various incompatibilities and resource sharing issues.

3. Rigidness: Applications are installed into the operating system in a way that prevents the applications from being "detached" and migrated between different computers; applications are executed exclusively within the environment in which they were initially installed.

4. Security: When applications and the operating system are fused together, internal cross contamination is almost inevitable.

These problems have resulted in information technology (IT) departments expending substantial wasted time, money and manpower on application lifecycle tasks, regression/compatibility tests, deployment and management, help desk and support issues, and more. Moreover, users cannot roam profiles, i.e., switch between computers and work with common applications without installing and registering those applications on each computer. Thus, the user or a system administrator has to configure the personalized information when switching between computers.

SUMMARY OF THE INVENTION

Certain embodiments of the invention include a method for bi-directional synchronization of user data files between a client and at least one server, wherein a user data file includes a session file, an index file and a data file. The method comprises determining if a match exists between a local session file and a reflection session file, wherein the local session file is maintained by the client and the reflection session is maintained by the at least one server; when the local session file and the reflection session file match, performing: synchronizing contents of a user data file maintained by the client with contents of a user data file maintained by the at least one server, when the user data file in the client includes more records than the user data file in the at least one server; and synchronizing contents of a user data file maintained by the at least one server with contents of a user data file maintained by the client, when the user data file in the client includes less records than the user data file in the at least one server.

Certain embodiments of the invention further include a method for writing a data block to a user data file by a software application, wherein the user data file includes a session file, an index file, and a data file. The method comprises upon reception of a write request, computing a page index of a page in the index file; computing an offset value to a location of the page in the index file; determining a write offset indicating a location in the data file for the data block; and writing the data block at the location indicated by the write offset.

Certain embodiments of the invention also include a method for reading a data block to a user data file by a software application, wherein the user data file includes a session file, an index file, and a data file. The method comprises upon reception of a read request, computing a page index of a page in the index file; computing an offset value to a location of the page in the index file maintained by a client; determining using the computed offset value a location containing a most updated version of the data block; and reading the data block from the determined location.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
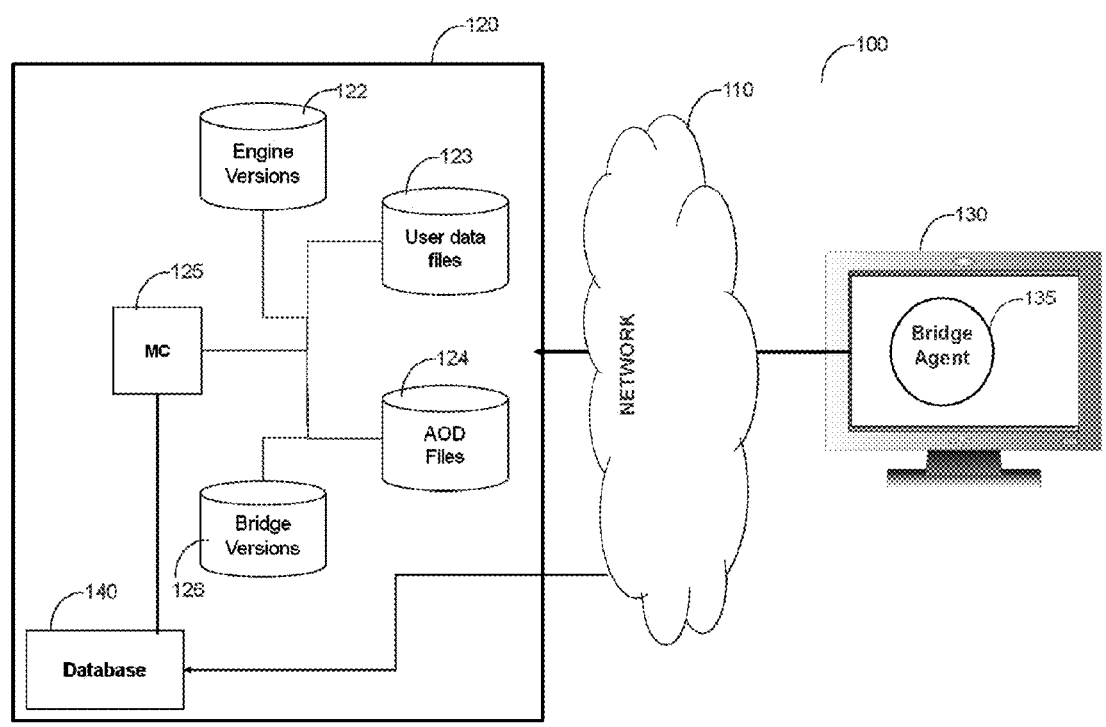
FIG. 1 is a diagram illustrating a computer network system useful in describing the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a diagram illustrating a computer network system 100 useful in describing the principles of the invention. Without limiting the scope of the invention the system 100 is a simplified structure of a computer system deployed in an organization where only a single file server 120 is connected through a network 110 to a single personal computer (PC) 130. It is appreciated that such systems typically includes one or more file servers and a plurality of PCs of users in the organization. The file server 120 may employ any file system including, for example, network file system (NFS), a common internet file system (CIFS), and the like. The network 110 may be, but is not limited to, a local area network (LAN), a wide area network (WAN), the Internet, or any combination thereof.

The PC 130 may be any computing device running an operating system and include, for example, a laptop computer, a smart phone, a personal digital assistance (PDA), and the like. The PC's operating system maybe, but is not limited to, a Windows® XP®, Windows Vista®, Linux®, and the like. Data between the file server 120 and the PC 130 may be exchanged using a communication protocol including, for example, HTTP, HTTPS, SAMBA, and the like.

In accordance with a preferred embodiment, the PC 130 runs a bridge agent 135 which is a virtual service that enables central deployment of virtual software applications on the PC 130 without altering or making changes to the PC 130. In accordance with this embodiment, the bridge agent 135 retrieves, from the file server 120, files of virtual applications assigned to a user of the PC 130 and cause the execution of these applications over the PC 130. In addition, the bridge agent 135 performs shell integration by binding the virtual applications to the operating system shell without writing to the PC's 130 registry or file system. The virtual applications function as if they were installed on the PC 130 and are available online and/or offline. An operating system shell which provides access to the kernel services of the operating system. The PC 130 may be a locked-down computer which is a computer being operated by a user account or process that does not have full administrator permissions. The PC 130 may also run non-virtual applications with or without the control of the bridge agent 135.

In accordance with an embodiment of the invention, a virtual application consists of the following files: a virtual engine, a user data file, and an application on demand (AOD) file. The virtual engine is an executable computing environment with its own read/write file system and registry, dynamic link library (DLL) repositories, and named objects. An AOD file includes all of the resources that an application needs to run, such as an internal virtual services manager, a digital rights management layer, a connectivity layer, and a protection layer. The protection layer seals the virtual applications from the environment of the host operating system of the PC 130 and provides the virtual applications with the required function calls and returned data and further preventing any data from being written to the host operating system. The connectivity layer enables the virtual application to communicate with other virtual applications and define the integration with the operating system shell. For example, the connectivity layer includes registry keys and files that contain shell components, such as file extensions, programs files links, system tray, quick launch, and so on.

A virtual application executed over the PC 130 does not write data, files, registry keys, and so on to the host operating system, but instead to the user data file that contains all the data written during the time the virtual application was active. The user data file may also include modified preferences, temporary files, registry changes, user files (e.g., documents, music, video, etc.), and so on. User data files may be encrypted. A detailed discussion on the execution of virtual applications can be found in U.S. patent application Ser. No. 11/697,700 filed Apr. 6, 2007 and U.S. application Ser. No. 11/697,702 filed Apr. 6, 2007, the contents of which are incorporated by reference herein in their entirety.

The virtual engines are stored, per virtual application, virtual engines are stored independent of virtual application, where only a single instance of a virtual engine is maintained in a storage unit 122, the user data files are saved, per user and per application, in a storage unit 123, and the AOD files are maintained in a storage unit 124. In other implementations user data files, AOD files, and virtual engine files may be stored locally on the user PC. All storage units 122, 123 and 124 may be part of the file server 120 which also includes a storage unit 126 for maintaining different versions of the bridge agents 135, each version may be per user or group of users.

Figure 2:
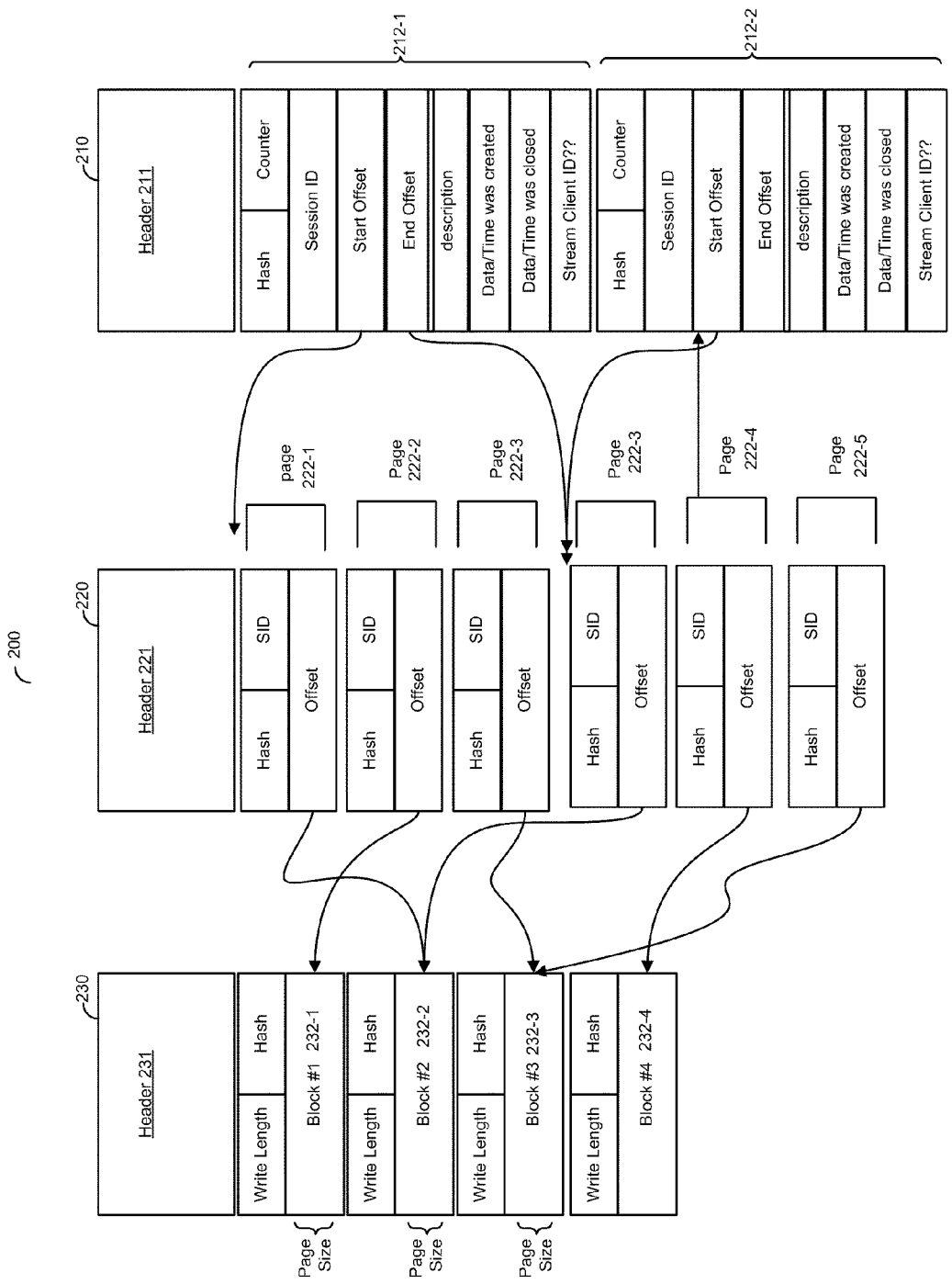
FIG. 2 is a diagram illustrating the contents of a user data file constructed in accordance with an embodiment of the invention.

In accordance with the principles of the invention a block level management and bi-directional synchronization of user data files between the file server 120 and PC 130 are provided to enable at least: 1) maintaining consistency of user data files kept; 2) roaming of user profiles; and 3) restoring data to a specific point in time. These tasks are enabled due to the proprietary structure of the user file data which is constructed in accordance with an embodiment of the invention and illustrated in FIG. 2.

A user data file 200 comprises three "files" or data structures, including a session file 210, an index file 220, and a data file 230. The session file 210 includes a single header 211, which records, for example, a file version and the length of the entire file. The session file 210 keeps a record of each session during which the application was accessed. For example, the session file 210 maintains two sessions 212-1 and 212-2, each of which records several pieces of information. This information includes a hash table, a counter, a session identifier (SID), a start offset and end offset or total bytes into the user data file a session occupies, a brief description of the respective session, a date/time stamp when the respective session was created, a date/time stamp when the respective session was terminated, and an optional field for a stream/client ID. Every time the user opens any virtual application from a predefined group of virtual applications, a new session is created in the user data file 200. For example, if the predefined group of virtual applications includes Microsoft® Word and Excel, then when any of these applications (e.g., Word) is opened a new session is established later on when the Excel is started, it runs in the already established session.

The index file 220 keeps track of pointers to the actual user data contained in the data file 230. The index file 220 contains its own header 221 which maintains a file version and total length of the index file 220. The file 220 further comprises a plurality of pages (collectively referred to as pages 222), where each group of pages 222 corresponding to a given session 212 based on that session's start and end offset in the session file 210. For example, pages 222-1, 222-2 and 222-3 correspond to a session 212-1. Each of the pages 222 contains fields for a hash value and session ID (SID) taken from the hash value and session ID in the corresponding session 212. Unique to each of the pages 222 is an offset field corresponding to the location or pointer to the beginning address of a block of data in the data file 230. As a new data block from each session is added to the data file 230, more pages 222 are created.

The data file 230 contains the actual user data and includes a header 231 and a plurality of data blocks 232. The header 231 contains at least a file version and file page size. A data block 232 corresponds to a given page pointed to by an offset field in the index file 220. Each of the blocks 232 contains fields for a hash value and write length which holds the number of bytes written to the respective block. Each number of bytes in each data block 232 cannot exceed a page size. When a page size of data is exceeded, a new block is created, a new page 222 is added to the index file 220 with its own offset value, and the end offset field of the current session 212 in the session file is updated. If a user works with current data in a block (e.g., block 232-1) and this data belongs to the current session, then that block is overwritten. If new data is to be added, or a user is working with the same data in a different session, then a new block (e.g., block 232-4) is appended to the data file 230 instead of overwriting an older session block.

Whenever a user operates in a session with the file server 120 being connected to the PC, the user data file 200 stored locally at the user's PC 130 is being continuously synchronized with a corresponding user data file on the server. If the user works offline, then when the user re-connects to the server 120, the user data file of the user's PC 130 is more advanced than that of the server, thereby requiring synchronization of the user data file. The server 120 accesses the session file of the user's PC 130 and modifies the appropriate entries in its copies of the user data file 200 so as to match the user data file of the user's PC 130. When synchronization occurs in only blocks that are in difference are streamed from one location to another instead of copying the entire file. This operation can be easily implemented using the structure of the user data file 200.

In addition to data synchronization, the structure of user data file 200 is highly efficient in restoring data to a specific point in time. As noted above, new data in a new session is not overwritten, but rather appended to the data file 230. Each data block in the file 230 is pointed by an index to which a specific session 212 points. As each session 212 records its creation date/time and the date/time it was closed. Therefore, restoring data to a specific point in time can be done through a session 212 that was active at that time.

It should be noted that although described with reference to a virtual application the user data file 200 can be part of non-virtual software applications. Furthermore, the structure of the user data file 200 is not related to any file system or to any communication protocol. Therefore, utilizing the contents of the user data file 200 for the bi-directional synchronization, roaming profiles, and restoring data to a specific point in time ensure that the these tasks can be performed on any type of file server and PCs regardless of the type of file system or communication protocol they employ.

Figure 3:
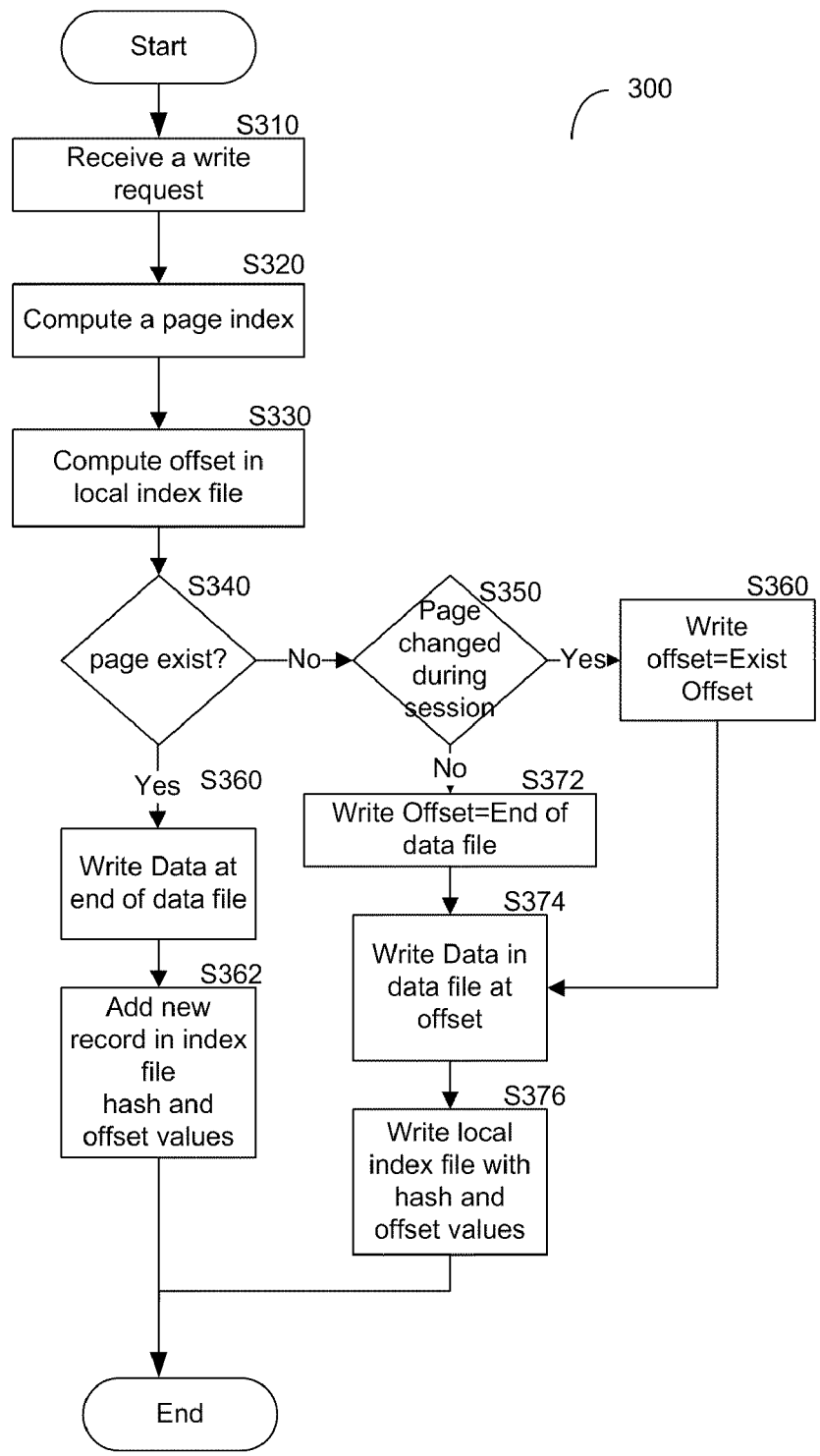
FIG. 3 is a flowchart of a write operation implemented in accordance with an embodiment of the invention.

FIG. 3 shows a non-limiting and exemplary flowchart 300 of a write operation implemented in accordance with an embodiment of the invention. The write operation is executed during the course of a user working with an application or a virtual application. At S310, a write request to write data to the user data file 200 is received. A write request typically includes a data block and the size of the data to be written. The user data file 200 is either opened or already has been loaded into local memory.

At S320, a page index value is computed for reference to the index file 220. This value may be calculated by dividing the offset value in the request by a page size. At S330, the offset into the index file 220 is calculated to reach the location of a page determined by the calculated page index. In one embodiment the offset may be computed as follows:

$$\text{Offest}=\text{start\_position}+\text{page\_index}*\text{record\_size}.$$

At S340 it is checked if a page 222 of the respective calculated page index exists in the index file 220, and if so execution continues with S350; otherwise, execution continues with S360. If the page does not exist in the index file, then at S360, the data is appended the data file 230 as a new block 232. At S362, a new record including hash and offset values is added to the index file 220.

At S350 it is determined if the page has been changed during the current session, and if so at S360, the write offset is set to the offset computed at S330 for overwriting the data in the data file 210; otherwise, execution continues with S372 when the data is to be appended to the data file 230. Specifically, at S372, the write offset is set to the end of the data file 230. At S374, the data is written to the data file 210 at the appropriate offset. At S376, the respective page 222 in the index file 220 is updated with the hash and offset values, and execution ends.

Figure 4:
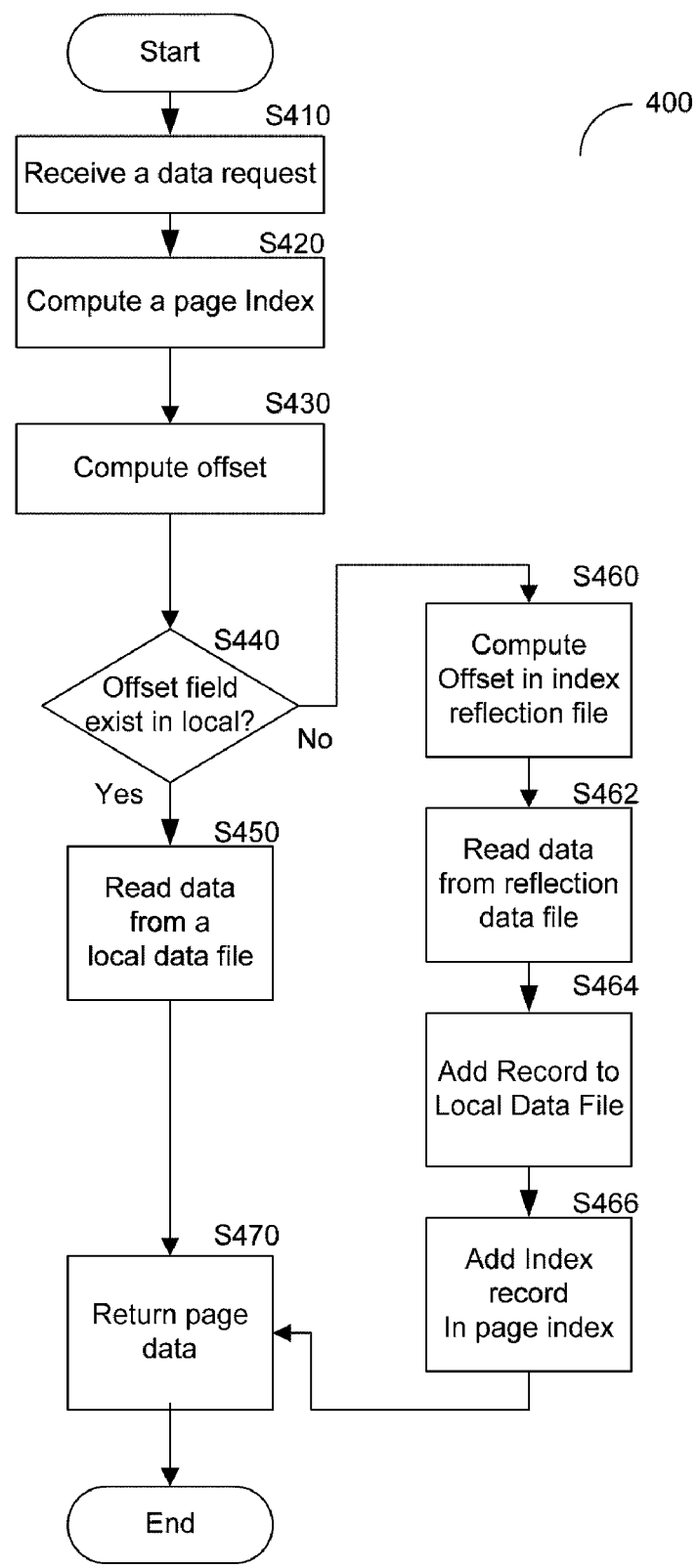
FIG. 4 is a flowchart of a read operation implemented in accordance with an embodiment of the invention.

FIG. 4 shows a non-limiting and exemplary flowchart 400 of a read operation implemented in accordance with an embodiment of the invention. The read operation executed during the course of the user working with the application. At S410 a read request to perform a read operation is received. The read request contains a reference to the current session (i.e., a SID) at a particular offset value in the session 212 with a read size in bytes. At S420, a page index value is calculated for reference to the index file 220. At S430, the offset into the index file 220 is computed. In one embodiment the offset into the index file may be computed as follows:

$$\text{Offest}=\text{start\_position}+\text{page\_index}*\text{record\_size}.$$

At S440 it is checked if an offset field having the offset value computed at S430 exists in a local index file maintained by the PC. If so, at S450 a page of data is read from the local data file 210 and returned to the application at S470. The correct data block is accessed through the index file 220, based on the computed page index and offset value. Local files refer to files in the PC 130 while reflection files refer to files in the file server 120.

If S440 results with a No answer (i.e., the page and offset are not in the local index file 220), then the file server is being contacted to the PC, and thus the updated data resides in the server. At S460, an offset into a reflection index file maintained by the server is computed as discussed at S430. At S462, a block of data is read from a reflection data based on an offset and size value. At S464, the data block read from the server is added to the data file maintained locally by the PC, and at S466 the local index and session files are updated to point to the newly added data block. Then, execution proceeds to S470.

Figure 5:
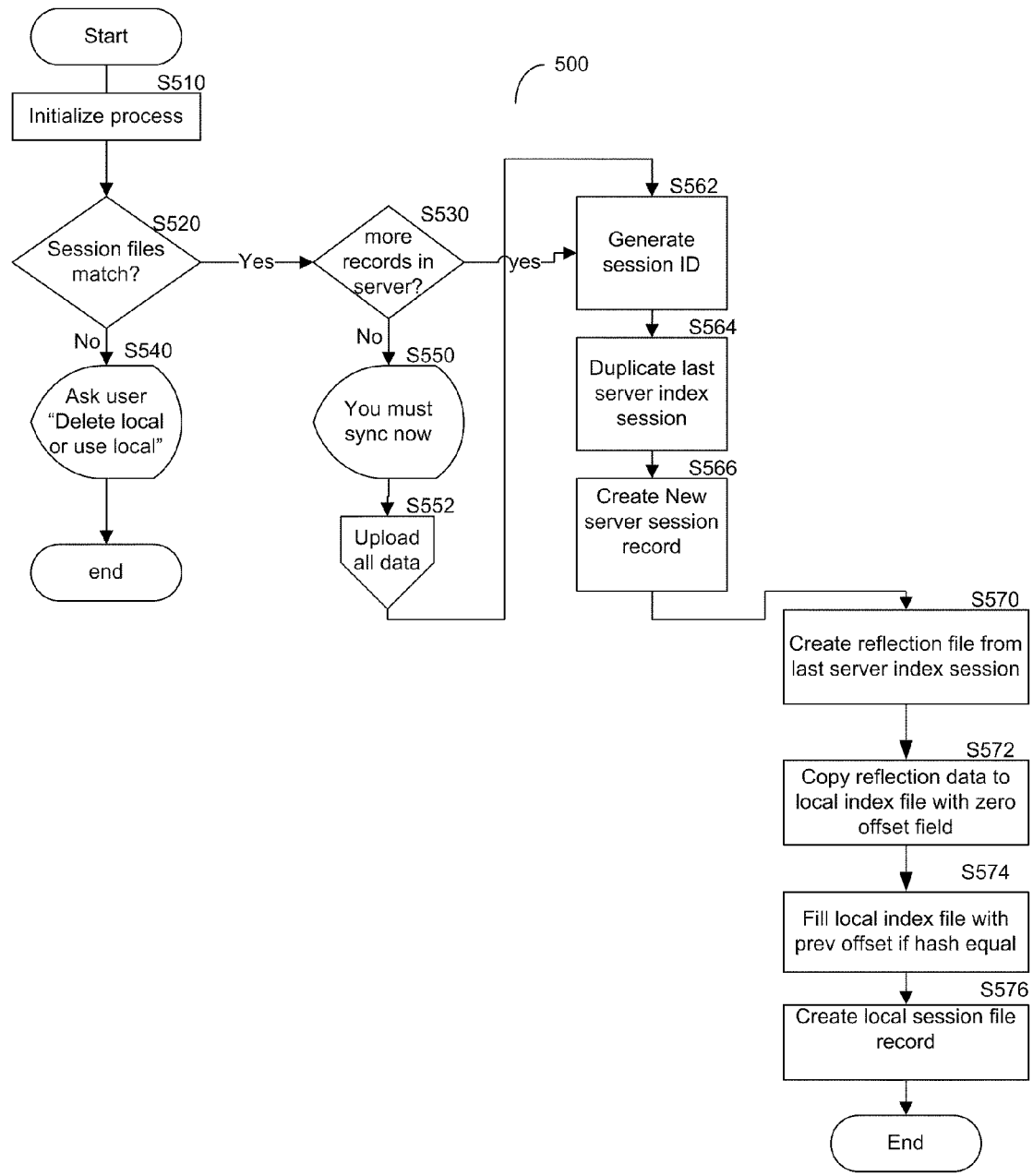
FIG. 5 is a flow diagram of a bi-directional synchronization operation between a local user data file and a server user data file.

FIG. 5 shows a non-limiting and exemplary flowchart 500 of a synchronization operation between a client's user data file and a server's user data file implemented in accordance with an embodiment of the invention. The synchronization is also referred to as a bi-directional synchronization and provides the ability to stream user data files from the file server 120 to a PC 130 and vice versa, without installing any software on the PC 130. There are different scenarios that may occur in the context of synchronization including, for example, a PC keeps an advanced version of the user data file than the file server; the server keeps more advanced session than the client (e.g., a user moves from a session on one computer to an older session on a second computer), or there is a mismatch between the user data file versions (neither the client or the server side session files is a subset of the other session file).

At S510, the synchronization operation is initiated. At S520, it is checked if there is a match between the local session file and the server's session file, and if so execution continues with S530; otherwise, at S540 the user is prompted to choose between synchronizing based on either the PC version or the server version of the user data file. If at S530, there are more records in the data file maintained locally by the PC 130 than the data file maintained by the server, then at S550 the user is prompted for uploading the local user data file. At S552, the local user data file is uploaded to the server to overwrite the server's user data file. It should be noted that if the number of records in both data files is equal, no synchronization is required and execution ends.

Following from S552, or if there are more records in the server's data file, then the local user data file is updated with the server's user data file. Specifically, steps S562 through S576 include updating the session file and the index file of the server with the contents of the respective files maintained by the client, while data blocks are written to the local data file in the background (while the user is working) or whenever the user decides to read data from the server.

At S562, a session ID is generated, and at S564 the server's index file of the session is duplicated. At S566, a new session record is created in the server's session file. At S570, a reflection index file is created to include the contents from the server's index file of the last session. At S572, the contents in the reflection file are copied to a local (maintained by the PC) index file with a zero value in the offset field. At S574, the local index file is filled with the previous offset if the hash values in the local and server's index files are equal. At S576, a local session file is created.

It should be appreciated that the synchronization operation described herein can be utilized for roaming profiles. As the user initially logs to a computer the version of user data file in the PC is compared to that stored at the server. As the server holds the updated version the contents of the server's user data file is copied to the PC and changes made thereafter by the user on the local version of the user data file as synchronized back to the server. Therefore, when the user switches to a new PC all the most updated version of the user data file is uploaded to the PC. As the user data file includes the personalized information, the user or a system administrator does not need to reconfigure this information when switching between computers.

The principles of the invention may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A computer-implemented method for bi-directional synchronization of user data files between a client and at least one server, wherein a user data file includes a session file, an index file and a data file, comprising:
   determining if a match exists between a local session file and a reflection session file, wherein the local session file is maintained by the client and the reflection session is maintained by the at least one server;
   when the local session file and the reflection session file match, performing:
   synchronizing contents of a user data file maintained by the client with contents of a user data file maintained by the at least one server, when the user data file in the client includes more records than the user data file in the at least one server; and
   synchronizing contents of a user data file maintained by the at least one server with contents of a user data file maintained by the client by creating a new session record including a session identifier (ID) and an offset value; creating a new local index file to include the contents of a reflection session file respective to a last session; creating a new local session file to include contents of the new session record; and offline copying data blocks in from a data file maintained by the server to a data file maintained by the client, said synchronization with the contents of the user data file maintained by the client is performed, when the user data file in the client includes less records than the user data file in the at least one server.

2. The method of claim 1, further comprising:
   prompting a user to select one of a user data file in the at least one server or a user data file of the client to be deleted, when the local session file and the reflection session file do not match.

3. The method of claim 1, wherein synchronizing contents of the user data file maintained by the client with contents of the user data file maintained by the at least one server, further comprising:

streaming data blocks from the client to the at least one server to overwrite the contents of the user data file maintain by the server.

4. The method of claim 3, further comprising:
creating a new session record including a session identifier (ID) and an offset value;
creating a new local index file to include the contents of the reflection index file respective to the last session; and
creating a new local session file to include the contents of the new session records.

5. The method of claim 1, wherein the bi-directional synchronization of user data files is utilized for roaming profiles of users between clients.

6. The method of claim 5, further comprising:
when a user logs on to a client performing:
synchronizing the contents of the user data file stored in the at least one server with the contents of the user data file stored in the client;
periodically synchronizing the contents of the user data file stored in the client with the contents of the user data file stored the at least one server, while the user is logged on to the client, thereby when the user logs off the client the at least one server maintains an updated copy of the user data file.

7. The method of claim 6, wherein a user data file includes at least personalized information of a user, wherein the user data file is being accessed by a software application during its execution.

8. The method of claim 7, wherein the software application is at least a software virtual application.

9. The method of claim 1, wherein the bi-directional synchronization is performed regardless of a communication protocol type employed between the clients and the at least one server and regardless to the configuration of either the client of the at least one server.

* * * * *